Aug. 9, 1966 F. SOLODUK 3,264,686
EXTRUDING DIE JAW ADJUSTMENT
Filed May 1, 1964 3 Sheets-Sheet 1
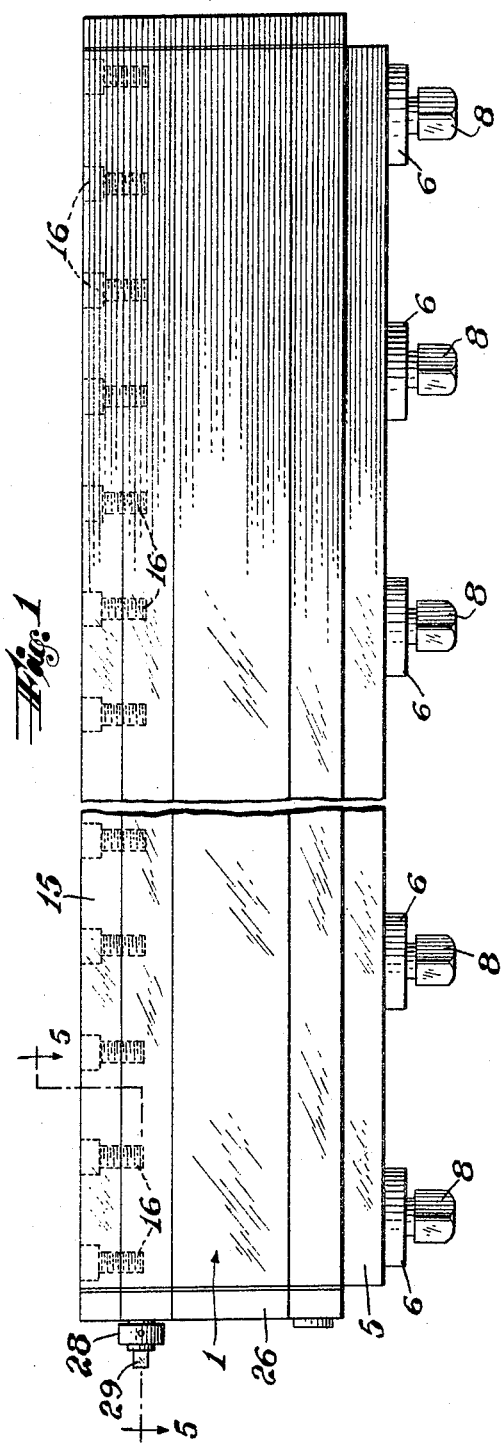
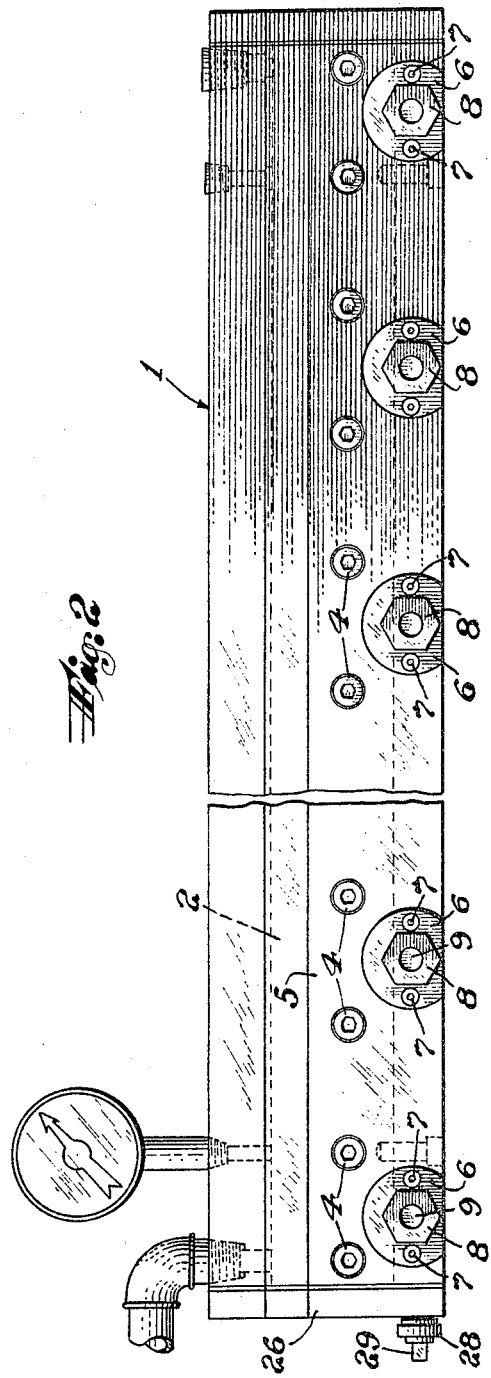
INVENTOR.
Fred Soloduk
BY
ATTORNEY

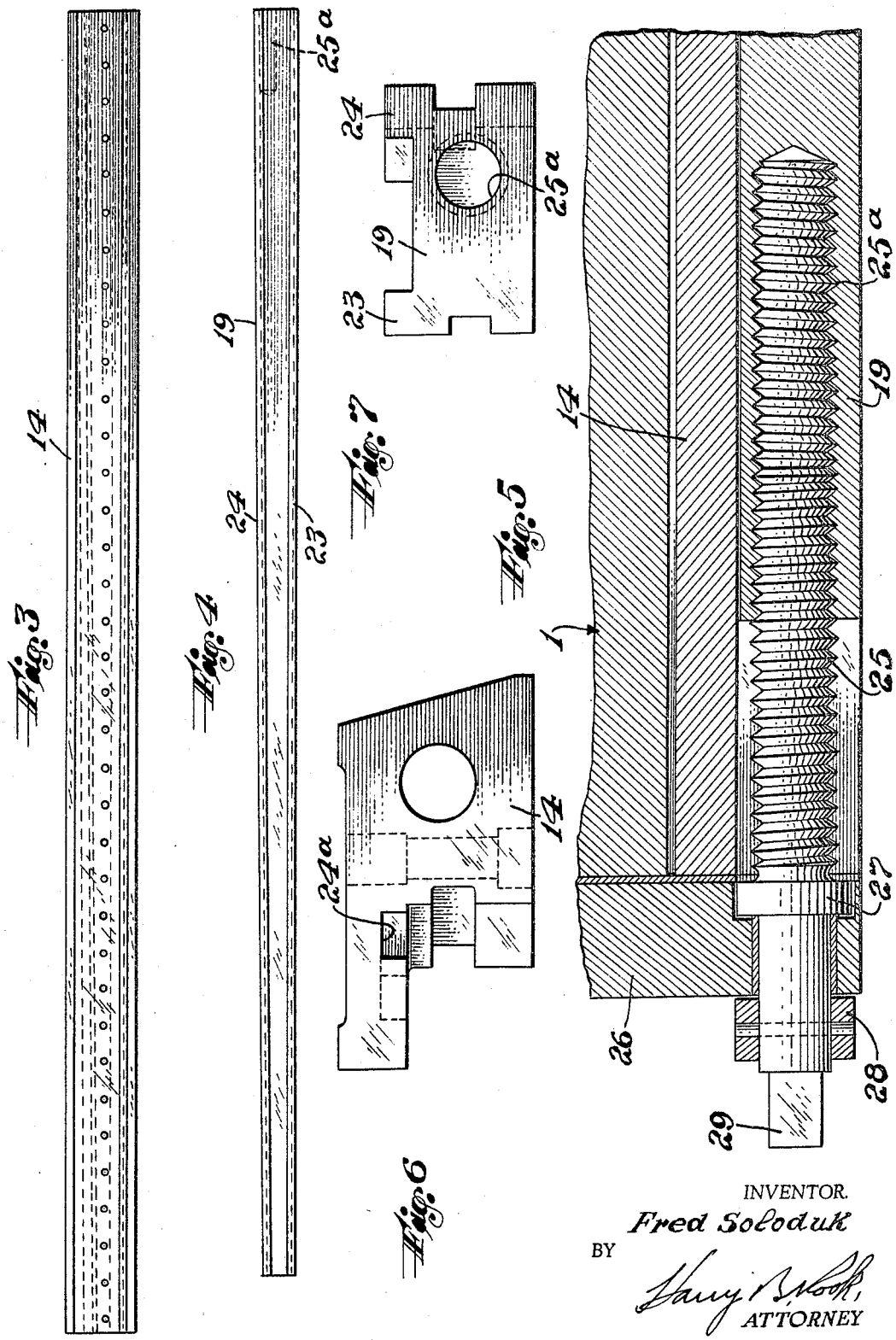

Aug. 9, 1966   F. SOLODUK   3,264,686
EXTRUDING DIE JAW ADJUSTMENT
Filed May 1, 1964   3 Sheets-Sheet 3

INVENTOR.
Fred Soloduk
BY
Harry B. Cook,
ATTORNEY 3,264,686
EXTRUDING DIE JAW ADJUSTMENT
Fred Soloduk, Belle Mead, N.J., assignor to Frank W. Egan & Company, Somerville, N.J., a corporation of New Jersey
Filed May 1, 1964, Ser. No. 364,135
6 Claims. (Cl. 18—12)

This invention relates to a means for adjusting the orifice opening of a flat film extrusion die, curtain coater head or similar device. More particularly, it relates to a means for adjusting such dies which allows rapid, simple and accurate adjustment for the purpose of allowing a variety of thicknesses of thin, flat sheets or films to be produced.

Dies of the general type used for extruding plastic film or for use as curtain coater heads have cavities that taper to an orifice which is long, narrow and slit-like in configuration. A plastic, a wax blend or some such material is forced through said orifice thereby extruding a continuous flat, thin sheet or film. It is economically advantageous that dies of this type be so constructed as to permit adjustment of the narrow slit-like orifice thereby providing the ability to produce sheets or films of various thicknesses from the same die. Usually adjustable dies of this type have one movable jaw which allows the operator to adjust the die orifice to suit the required thickness of film or sheet desired. Also dies of this type, being used of necessity at high pressures and various temperatures, and subject to warping or distortion, require that the adjustable jaw be so constructed as to allow for adjustment of the orifice opening at any point along its entire length, such adjustment compensating for local variations of film thickness. Usually these two adjustment requirements are provided for by a series of adjustment screws along the length of the movable jaw. When it is desired to change the overall thickness of the sheet or film being produced, each individual screw must be adjusted. The result is a time consuming process to establish the required film thickness and especially the required film thickness uniformity.

Therefore, objects of this invention are to provide a means whereby an adjustment of a die orifice can be accomplished to permit the production of films or sheets of various thicknesses without disturbing the aforementioned adjustment screws, said adjustment screws being reserved for use solely to compensate for irregularities in film thickness; and to provide such means in the form of a second movable jaw which is adjusted as a unit allowing over-all thickness of film to be changed.

Further objects are to provide a second movable die jaw that can be easily and quickly adjusted as a unit while the die is in operation without the necessity of shutting down the extrusion or curtain coating process; and to provide novel and improved means for adjustment of the jaw which are readily accessible and adjustable with simple tools while the machine is in operation.

Another object is to provide such a second movable die jaw and associated adjusting mechanism which has simplicity of design for ruggedness, lasting accuracy and minimum maintenance requirements.

A further object is to provide such means of adjustment which are self-contained and require no electric power, water, air or hydraulic power.

Other objects, advantages and results of the invention will appear from the following description in conjunction with the accompanying drawings in which:

FIGURE 1 is the top plan view of a curtain coater extruding head with two movable jaws;

FIGURE 2 is a side elevation, showing the jaw adjustment screws used for adjusting one jaw for localized changes of film thickness;

FIGURE 3 is a top plan view of the second and quickly adjustable jaw;

FIGURE 4 is a top plan view of the adjusting bar;

FIGURE 5 is a partial sectional view taken on the plane of line 5—5 of FIGURE 1;

FIGURE 6 is the end view of FIGURE 3;

FIGURE 7 is the end view of FIGURE 4; and

Figure 8:
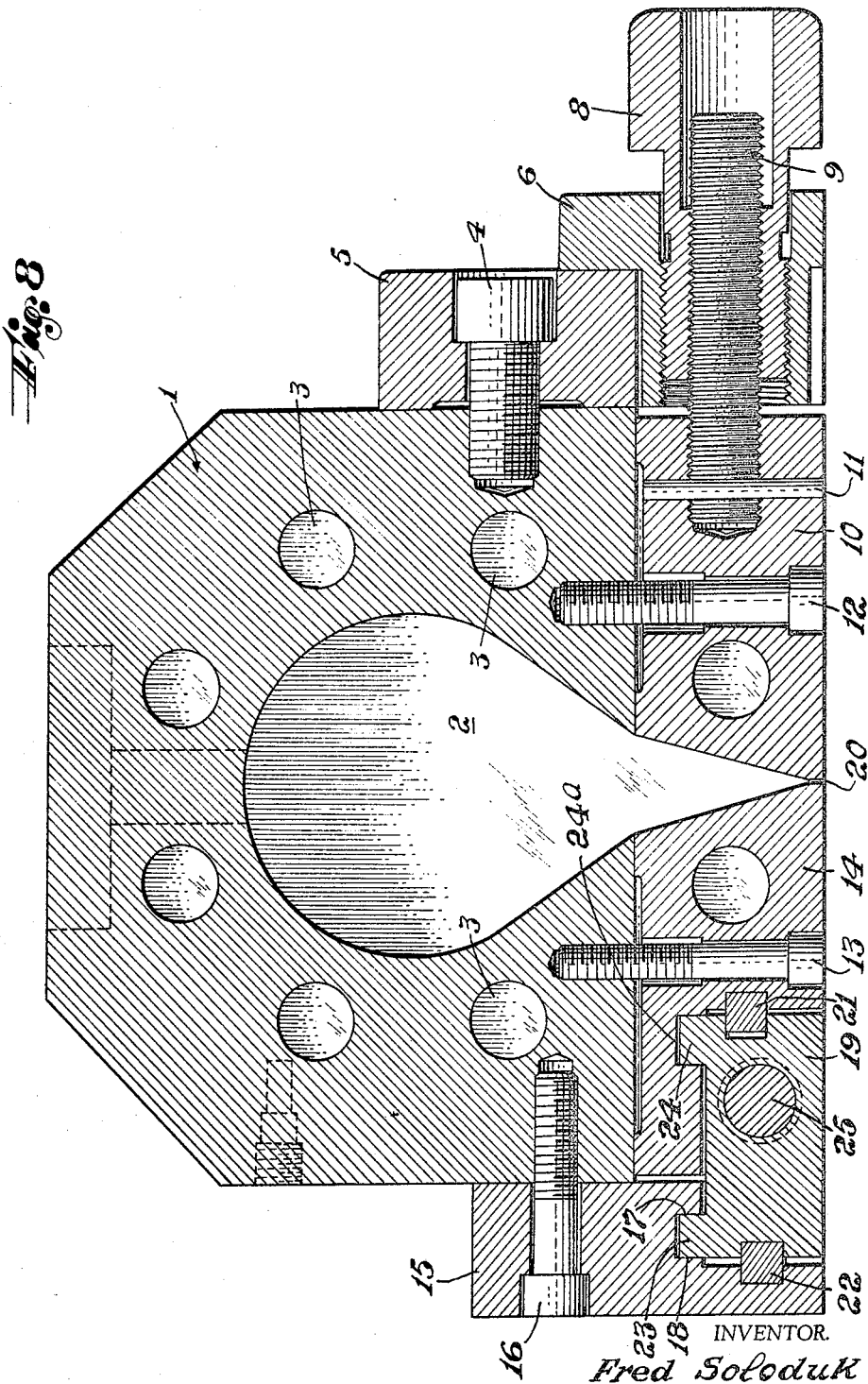
FIGURE 8 is an enlarged cross-sectional view of the curtain coater head.

Referring to the drawings, the reference character 1 designates the body of a curtain coater head of the type used for coating substrates with various wax blends. The body 1 is provided with a central cavity 2 which runs parallel to the sides and top in a longitudinal direction extending the full length of the die. Also extending the full length of the die and running parallel with and circumscribing the central cavity are heater wells 3. Affixed to the body 1 by means of socket head cap screws 4 and running the full length of the die is a strip 5 which provides bearing surfaces for internally threaded, shouldered inserts 6. Inserts 6 are attached to strip 5 by means of screws 7 which prevent rotation of inserts 6 thereby allowing relative rotation to occur between adjustment nuts 8 and the inserts 6 when nuts 8 are turned. Screwed through adjustment nuts 8 and secured against rotation in movable die jaw 10 are threaded studs 9. Roll pins 11 extend through studs 9 locking them in one movable jaw 10. Socket head cap screws 12 serve to hold movable jaw 10 against the die body. In practice, screws 12 are tightened just enough to keep jaw 10 in place against body 1 and prevent leakage of material through the interface between jaw 10 and the die body. They are not kept so tight as to prevent relative movement between the two when adjustment nuts 8 are turned. Clearances are provided around screws 12 in movable jaw 10 to allow for this relative motion.

In a like manner, screws 13 hold a second movable jaw 14 against the die body. A guide strip 15 is fastened to the die body by screws 16 and provides guide surfaces 17 and 18 which extend the full length of the die and upon which the projection 23 of an adjusting bar 19 slides. Projection 23 extends the full length of the adjustment bar, but adjustment bar 19 is several inches shorter than the length of the die body.

The second movable jaw 14 and adjusting bar 19 which are the subject of this invention along with guide strip 15, screw 25 and end plate 26, provide the means for rapid, simple and accurate adjustment of the die orifice 20. The adjusting bar is held in place by key 21 and key 22 which extend the full length of the die body and which permit movement of the adjusting bar in a longitudinal direction. A projection 24 on the top of the bar 19 is slidable in a groove 24a in the jaw 14. As shown, the projection 23 on the adjusting bar 19 and the guide surfaces 17 and 18 on guide strip 15 are parallel to the edge of the die jaw 14 that forms one side of the slot 20, while the projection 24, key 21 and side walls of the groove 24a in the jaw 14 are biased or inclined to said edge of the die jaw. Adjustment screw 25 is threaded into an opening 25a in the adjusting bar and extends out through the die end plate 26 which is secured on the body 1. Shoulder 27 and collar 28 on the adjustment screw 25 prevent axial movement of the screw relative to the end plate and the die body.

In operation, a plastic melt or wax blend is pumped into the cavity 2 of the curtain coater head under pressure and elevated temperature, and is forced to flow down through the slit-like orifice 20, issuing as a continuous curtain. The curtain is then applied to a substrate by moving the substrate through it. It is not intended, however, to limit this invention to curtain coating heads only as it may be applied to similar dies such as those used for extrusion coating, extrusion casting and the like equally well. The thickness of the film or curtain issuing from orifice 20 is changed easily and quickly by rotation of the adjusting screw 25 with a wrench applied at 29. Rotation of the adjusting screw 25 produces longitudinal movement of adjusting bar 19 relative to the die body, and this movement in turn causes transverse movement of jaw 14 because of the biased nature of projection 24, changing the width of the orifice opening 20 between the two jaws.

It is evident from the preceding description that this invention provides a means for the rapid, simple and accurate adjustment of the jaws of a curtain coater head or similar device, and that such adjustment permits changing of thickness of the curtain or film without the necessity of disturbing previous localized adjustments.

The screw 25 constitutes the operating member for the means for moving or adjusting the jaw 14 quickly as a unit to facilitate a quick setting of the jaws to produce a film or sheet of the desired thickness, and the screws and nuts 8 constitute the operating members of the means for adjusting the jaw 10 at various points along its length to compensate for local variations in film or sheet thickness.

I claim:

1. A film extrusion apparatus including a die body having an elongated opening therein, a pair of elongated jaws one at each side of said opening having faces forming an extrusion slot between them, means mounting one of said jaws on said body for movement as a unit to adjust its said face toward and away from the face of the other jaw, and means mounted on said body for adjusting said jaw as a unit providing for movement of the jaw positively and selectively in either direction, said means for adjusting the jaw including a single operating member.

2. A film extrusion apparatus as defined in claim 1 wherein the other jaw is mounted on said body and there is means for adjusting the second-mentioned jaw toward and from the first-mentioned jaw including plurality of adjusting members movably mounted on said body in spaced relation longitudinally of the second-mentioned jaw and each connected to said second-mentioned jaw for operation independently of the others.

3. A film extrusion apparatus as defined in claim 1 wherein the means for adjusting the jaw on the body comprises an elongated adjusting bar having two converging longitudinal surfaces spaced transversely of the bar in abutting contact with complementally converging surfaces on the body and on the side of the jaw opposite the face thereof forming the slot, respectively, means mounting said adjusting bar on said body for longitudinal movement, and means including said single operating member mounted on said body to move said adjusting bar longitudinally selectively in opposite directions and thereby move said jaw toward and from the other jaw.

4. A film extrusion apparatus as defined in claim 3 wherein the last-named means includes a support plate on said body in spaced relation to said jaw, and groove and key connections one between said adjusting bar and said support plate and the other between said adjusting bar and said jaw.

5. A film extrusion apparatus as defined in claim 1 wherein the means for adjusting the jaw on the body comprises an elongated adjusting bar having two converging longitudinal surfaces spaced transversely of the bar in abutting contact with complementally converging surfaces on the body and on the side of the jaw opposite the slot-forming face thereof, respectively, means mounting said adjusting bar on said body for longitudinal movement, and a screw having a rotatable but non-longitudinally movable connection with said body and screwed into said bar to actuate said adjusting bar longitudinally and thereby move said jaw relatively to the other body.

6. A flat film extrusion apparatus including a die body having an elongated opening therein, a pair of elongated jaws one at each side of said opening having faces forming an extrusion slot between them, means slidably mounting one of said jaws on said body for sliding movement as a unit relatively to the other jaw providing for adjustment of said face of the first-mentioned jaw toward and away from said face of the second-mentioned jaw, and means mounted on said body for adjusting the first-mentioned jaw and including coacting parts one of which is fixed on the body while another part is movable relatively to said fixed part for positively moving said first-mentioned jaw as a unit selectively in either direction, said means for adjusting the jaw including a single operating member connected to said movable part to move the latter.

References Cited by the Examiner

UNITED STATES PATENTS

| | | | |
|---|---|---|---|
| 2,168,889 | 8/1939 | Thomas | 18—12 X |
| 2,387,718 | 10/1945 | Coleman | 18—12 |
| 2,449,625 | 9/1948 | Stuart | 18—12 |
| 2,560,022 | 10/1951 | Formaz | 18—12 |
| 2,897,543 | 8/1959 | Weston et al. | 18—12 X |
| 2,938,231 | 5/1960 | Lowey | 18—12 |
| 3,122,789 | 3/1964 | Coffee. | |

References Cited by the Applicant

| | | |
|---|---|---|
| 2,718,661 | 9/1955 | Russell. |
| 2,727,276 | 12/1955 | Nelson. |
| 2,923,971 | 2/1960 | Nelson. |
| 3,096,543 | 7/1963 | Konopacke. |

WILLIAM J. STEPHENSON, *Primary Examiner.*